United States Patent [19]
Steiger

[11] 3,800,969
[45] Apr. 2, 1974

[54] FRONT END LOADER VEHICLE
[75] Inventor: Douglas W. Steiger, Red Lake Falls, Minn.
[73] Assignee: Hydra-Mac, Inc., Red Lake Falls, Minn.
[22] Filed: Jan. 3, 1972
[21] Appl. No.: 214,659

[52] U.S. Cl............... 214/778, 214/140, 180/77 H
[51] Int. Cl............................................. E02f 3/00
[58] Field of Search .......... 214/140, 778; 180/77 H, 180/6.48, 6.66; 74/471, 471 XY

[56] References Cited
UNITED STATES PATENTS
3,388,821   6/1968   McKean............................ 214/778
3,431,993   3/1969   Case ................................. 180/6.48
3,537,246   11/1970  Pool............................. 74/471 XY
2,456,320   12/1948  Repke.............................. 180/77 H
3,698,580   10/1972  Carlson........................... 214/138 R Primary Examiner—Robert J. Spar
Assistant Examiner—John Mannix
Attorney, Agent, or Firm—Williamson, Bains & Moore

[57] ABSTRACT

A front end loader vehicle with an improved control center for actuating a pair of power actuated vertically swinging arms with a power actuated scoop at the ends of the arms and for steeringly propelling the vehicle. The control center permits an operator to completely control his vehicle with a pair of dual function control shafts using only his hands.

4 Claims, 3 Drawing Figures

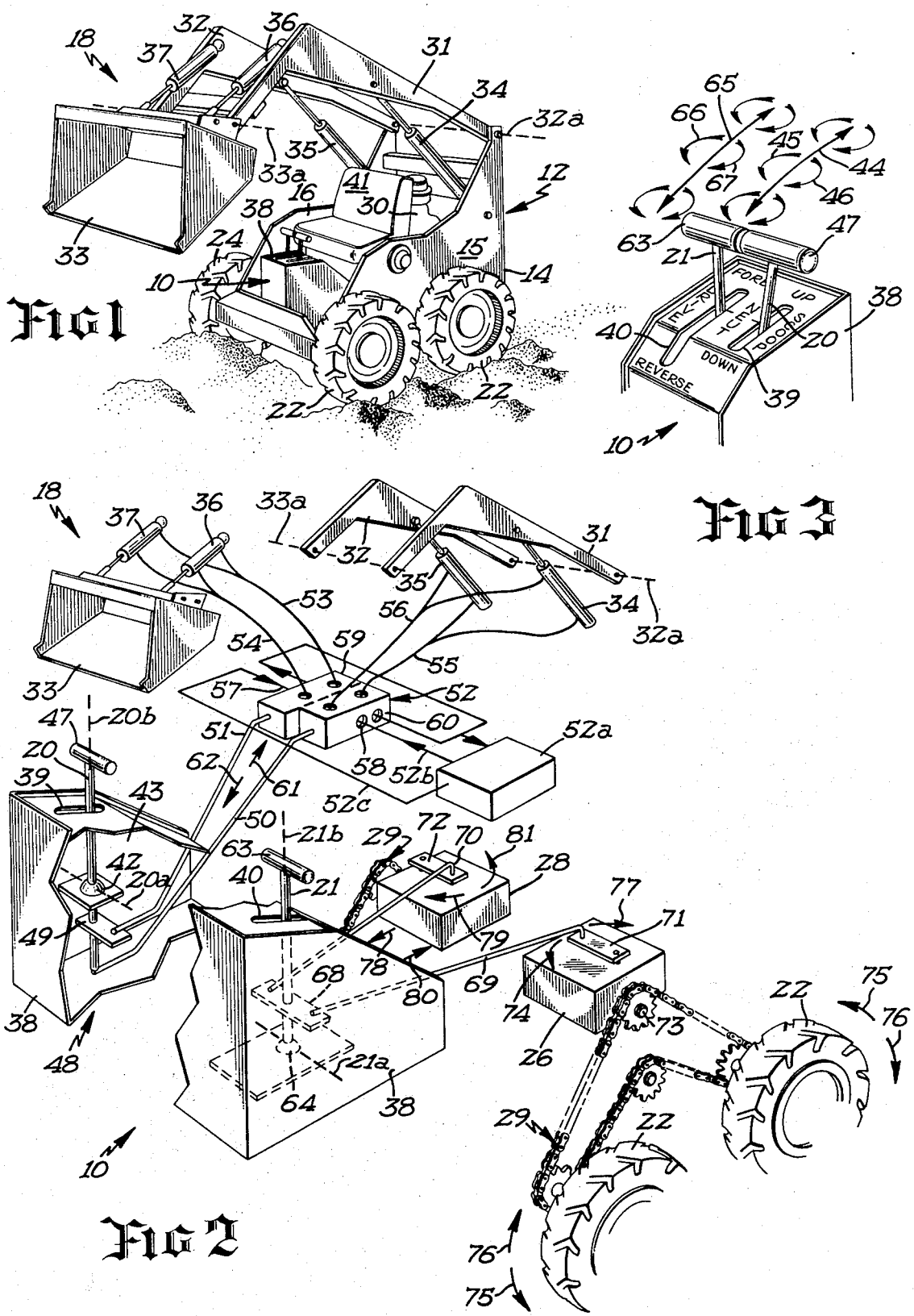

FRONT END LOADER VEHICLE

BACKGROUND OF THE INVENTION

A variety of front end loader vehicles are commercially available, and all are characterized as being relatively small, compact, light and inexpensive, but powerful and efficient for their size. These characteristics make the vehicles extremely desirable for small businessmen and farmers who need a vehicle for their lifting and moving tasks. These vehicles are particularly well adapted to the owner-operator and often are operated by operators who have little or no prior experience or training. Consequently, it is desirable that the vehicles be provided with control centers that are relatively simple, quickly and easily understood, and rapidly mastered without need for developing complicated foot-hand coordination habits.

Most commercially available front end loader vehicles have control centers which require considerable training and experience to operate properly. Ordinarily the vehicles are provided with hand and foot controls which require an operator to use feet for propelling and steering the vehicle and both hands for operation of the vehicle's power scoop assembly. Naturally, the development of the required hand-foot coordination necessary for automatic-reflex type synchronization of hands and feet to properly operate the vehicle requires considerable time. In the interest of both safety and vehicle performance, it is imperative that an operator handle his vehicle almost instinctively as various work conditions arise. If an extensive "get acquainted" period is to be avoided it is imperative that a control center for such a vehicle require a minimum of practice and experience to master it.

SUMMARY OF THE INVENTION

The invention utilizes a pair of dual purpose control shafts mounted in side-by-side relation and requires only hand manipulation by the operator, eliminating the prior art practice of requiring both hand and foot controls to operate the vehicle. Since an operator can master a series of hand operations far more rapidly than he can develop the hand and foot coordination required with the prior art vehicles, the invention results in a greatly improved front end loader vehicle which is simple to operate, quickly understood and rapidly mastered.

A scoop control shaft is pivotally mounted to the vehicle for forward and rearward swinging movement and for rotation about the axis of the control shaft, providing a control by which an operator can raise and lower the power actuated, vertically swinging arms of the vehicle's scoop assembly and simultaneously swing the scoop relative to the arm. A scoop linkage apparatus connects the scoop control shaft to power apparatus by which the power scoop assembly is energized in response to movement of the scoop control shaft.

A steering control shaft is positioned adjacent the scoop control shaft to permit an operator to use his remaining hand to propel the vehicle forwardly and rearwardly, or to turn it in desired direction. The steering control shaft is constructed and arranged like the scoop control shaft to permit identical hand movements by each of the operator's hands to further simplify the operation of the vehicle. Forward and rearward swinging of the control shaft produces progressively faster forward and rearward movement, respectively, of the vehicle, an intermediate neutral position between forward and rearward positions of the control shaft providing a position at which no driving energy is delivered to the vehicle. Rotation of the steering control shaft on its axis produces immediate turning of the vehicle.

BRIEF DESCRIPTION OF THE DRAWINGS

FIG. 1 is a perspective view of a front end loader vehicle utilizing the invention.

FIG. 2 is an exploded, diagrammatic view of the control center of the vehicle and the vehicle systems controlled thereby.

FIG. 3 is a view of the vehicle control center.

DESCRIPTION AND OPERATION OF THE INVENTION

Referring now to FIGS. 1 and 2, a front end loader vehicle 12 with body 14 including side panels 15 and 16 to which a power scoop assembly 18 including scoop 33 and arms 31 and 32 is pivotally mounted for movement has a control center 10 provided with scoop control shaft 20 and steering control shaft 21.

The vehicle 12 is provided with ground engaging means for support and movement of the vehicle in the form of two pairs of powered wheels 22 and 24, each pair being actuated by a drive unit 26 and 28, respectively, through chain and sprocket drives 29. The details of the vehicle engine 30, drive units 26 and 28, and the transmission linking the drive units with the engine are fully disclosed in copending U.S. Pat. application Ser. No. 78,874 filed Oct. 7, 1970, and entitled Front End Loader Vehicle by Douglas W. Steiger, and will not be discussed further here.

The side panels 15 and 16 of the vehicle have elongate arms 31 and 32, respectively, pivotally mounted at the rear of the panels for vertical swinging movement about a substantially horizontal axis 32a oriented transverse to the body 14. A loading scoop 33 is pivotally mounted to the arms 31 and 32 at the forward ends thereof for upward and downward swinging movement about a substantially horizontal axis 33a oriented substantially parallel to the pivotal axis 32a. Hydraulic cylinders 34 and 35 provide a means for vertically swinging the arms and are pivotally mounted to side panels 15 and 16, respectively, and extend to arms 31 and 32, respectively, to which they are also pivotally mounted, the pair of cylinders being arranged to raise and lower the arms 31 and 32 in response to operation of the control center 10 as will be described hereafter. A second pair of hydraulic cylinders 36 and 37 provide a means for swinging the scoop relative to the arms and are pivotally mounted between scoop 33 and arms 31 and 32, respectively, to swing scoop 33 upward and downward relative to the arms and about the axis 33a in response to manipulation of the said control center.

Referring now to FIG. 2, the control center 10 includes a control box 38 provided with slots 39 and 40 therethrough and is mounted at the forward end of the vehicle 12 in a position readily accessible to the hands of an operator at seat 41.

A generally elongate, upright scoop control shaft 20 passes through a pivotal mounting 42 which is fixed to the side 43 of the control box. The pivotal mounting 42 is contructed and arranged to permit scoop control shaft 20 to be swung fore and aft along an arc 44 and about a substantially horizontal axis 20a oriented transverse to the body 14 (FIG. 3) whose apex is at the pivotal mounting 42. The mounting 42 also permits the scoop control shaft 20 to be rotated about the longitudinal axis 20b of the shaft, the shaft being rotatable in either direction 45 or 46 at any point along the arc 44 through which the shaft swings.

The scoop control shaft 20 has a handle 47 extending transversely to the shaft adjacent the upper end of the shaft, permitting an operator in the seat 41 to easily swing the handle along arc 44 or rotate the shaft 20. The scoop control shaft 20 has a scoop linkage shown generally at 48 and comprising transverse member 49, and scoop links 50 and 51.

The scoop link 51 is pivotally mounted adjacent the end of transverse member 49 which is fixed to the scoop control shaft 20 to rotate therewith. Link 51 joins member 49 at a spaced distance from shaft 20 to obtain longitudinal movement of link 51 in response to rotation of scoop control shaft 20 about axis 20b. Scoop link 50 is pivotally mounted to the lower end of the scoop control shaft, and both links 50 and 51 extend to power apparatus which comprises the hydraulic valve assembly 52, the hydraulic lines 52, 54, 55 and 56 interconnecting the cylinders and the valve assembly, and a hydraulic pump 52a providing hydraulic fluid to the hydraulic valve assembly 52 along conduits 52b and 52c at a pressure level adequate to operate power scoop assembly 18.

Hydraulic fluid is supplied to inputs 57 and 58 of valves 59 and 60, respectively, of hydraulic valve assembly 52 by pump 52a which circulates fluid to the valves along conduits 52b and 52c, returning the fluid to pump 52a along conduit 52d. Longitudinal movement of scoop link 50 actuates valve 60, the link 50 being arranged such that movement aft in the direction of arrow 61 causes pressurized hydraulic fluid to leave assembly 52 along conduit 55 to cylinders 34 and 35 to thereby extend the hydraulic pistons therefrom and raise the arms 31 and 32. Movement of link 50 forwardly in direction 62 causes hydraulic fluid to be discharged from assembly 52 along conduit 56 to retract the pistons within cylinders 34 and 35 thereby lowering the arms 31 and 32.

Movement of scoop link 51 rearwardly in direction 61 causes hydraulic fluid to be released by valve 59 and to flow along hydraulic conduit 53 causing hydraulic cylinders 36 and 37 to extend their pistons, swinging the loading scoop 33 downward. Movement of the link 51 forwardly in the direction 62 causes valve 59 to discharge hydraulic fluid along the conduit 54 to cause hydraulic cylinders 36 and 37 to retract their pistons thereby swinging the scoop 33 upward.

Steering control shaft 21, also of generally elongate, upright construction has a transverse handle 63 adjacent the end of the shaft for manipulation by an operator. The lower end of the steering control shaft is constrained by pivotal mounting 64 which permits the shaft 21 to be swung through a generally forwardly rearwardly oriented arc 65 about a substantially horizontal axis 21a oriented transverse to the body 14 to span forward, neutral, and reverse positions. In addition the mounting 64 permits the shaft 21 to be rotated about its longitudinal axis 21b in directions 66 and 67 at any point along arc 65.

The pivotal mountings 64 and 42 provide a means for pivotally mounting the steering and scoop control shafts for swinging movement about a horizontal axis and for rotation about the longitudinal axis of the shafts 20 and 21. Such swinging movements may be about axis 20a and 21a or about a single axis passing through both mountings 64 and 42.

The steering control shaft 21 is associated with a steering linkage which comprises a transverse member 68, fixed to the shaft 21 and extending outward therefrom, steering links 69 and 70, and actuating members 71 and 72. Generally elongate motion transmitting steering links 69 and 70 are each pivotally mounted adjacent an end of the transverse member 68 and extend to actuating members 71 and 72, respectively, pivotally mounted on reversible drive units 26 and 28, respectively. Since the actuating member 71 and drive unit 26 are substantially identical to member 72 and unit 28, only drive unit 26 and actuating member 71 will be described in detail. The drive units comprise components of the power apparatus and are used to move the vehicle.

Actuating member 71 provides a means for controlling the drive unit 26 so the speed and rotational direction of the drive unit output shaft 73 may be regulated. Movement of the actuating member 71 in direction of arrow 74 causes the drive unit to rotate the wheels 22 in a direction 75 to produce forward movement, the extent of forward pivoting of the actuating member 71 determining the velocity of wheel rotation. Correspondingly, rearward pivoting of actuating member 71 causes the wheels 22 to be driven in a reverse direction 76, the velocity being dependent on the extent of rearward swinging of actuating member 71 in the direction of arrow 77. When the actuating member 71 is in the shown neutral position, no rotational energy is transmitted from the drive unit 26 to the wheels 22 and the vehicle remains stationary. The remaining drive unit 28 is identical in structure and operation and drives a second pair of wheels 24 on the remaining side of the vehicle using an identical chain and sprocket drive system. It will thus be seen that swinging of the steering shaft 21 in a forward or a reverse direction about axis 21a simultaneously swings actuating members 71 and 72 forwardly or rearwardly to produce forward or rearward movement, respectively, of the vehicle.

When the vehicle is to be turned, this is accomplished by driving the pair of wheels on one side in a forward direction 75 and the pair on the opposite side in a reverse direction 76.

The scoop control shaft 20 and the steering control shaft 21 are mounted in side-by-side close proximal relation, with the pivotal mountings 42 and 64 and slots 39 and 40 arranged so the arc through which each shaft swings defines a plane, the two planes thus defined being substantially parallel. Thus an operator can utilize substantially identical hand movements to totally direct the vehicle from a single convenient control center. The shown positioning of the control center also encourages an operator to keep his arms and hands safely near the center of the vehicle and out of range of the paths of the swinging arms 31 and 32.

It should be understood that the functions of each control shaft can be interchanged or varied and still successfully accomplish the purpose of the invention. For example, the loading scoop movement could be controlled by swinging of the shaft 20 instead of by rotation and the arm movement controlled by rotation of shaft 20 instead of by swinging. All such variations and modifications are within the purview of the invention.

In operation, an operator grips handles 47 and 63 with his hands and manipulates the controls to accomplish the particular task contronting him. When scoop control shaft 20 is retained in a "neutral" position the arms 31 and 32 remain stationary. If the arms are to be swung upward, the operator swings control shaft 20 forwardly about axis 20a toward the shown "up" position. As the control shaft 20 is swung, scoop link 50 is urged rearwardly by the shaft 20 in a direction 61 toward valve assembly 52 causing pressurized hydraulic fluid supplied by pump 52a to valve assembly 52 along conduits 52b and 52c to flow from valve 60 along conduit 55 to cylinders 34 and 35, causing the pistons to extend and raise the arms 31 and 32 by swinging them upward and about axis 32a. The pump 52a is energized by the engine 30 through appropriate coupling apparatus. When the arms are to be lowered the scoop control shaft 20 is swung rearwardly about axis 20a to the "down" position causing scoop link 50 to move forwardly in direction 62 away from the valve assembly 52, resulting in the flow of hydraulic fluid along conduit 56 to cause the pistons to retract within the cylinders, lowering the arms.

When the operator desires to swing the loading scoop 33 about axis 33a to produce downward movement relative to the arms, he rotates the scoop control shaft in the clockwise direction of arrow 46 about longitudinal axis 20b which results in transverse member 49 rotating with the shaft and acrrying scoop link 51 to produce longitudinal movement of the scoop link in forward direction 62 actuating the valve 59 in valve assembly 52. This movement of the valve 62 causes pressurized hydraulic fluid to flow along conduit 53 to cylinders 36 and 37 causing the pistons to extend outward therefrom, lowering the loading scoop 33. When it is desired to raise the loading scoop relative to the arms 31 and 32, the operator rotates scoop control shaft 20 in the counterclockwise direction 45 about longitudinal axis 20b causing the transverse member 49 to swing toward the valve assembly 52 to produce rearward longitudinal movement in the direction 61 toward the valve assembly to actuate valve 59. This actuation of the valve releases pressurized hydraulic fluid along conduits 54 to retract the pistons of cylinders 36 and 37, raising the loading scoop. It should be understood that rotation of the scoop control shaft 20 about axis 20b may be accomplished at any position of the shaft along the arc 44; consequently the scoop may be manipulated regardless of the position of the arms 31 and 32. Although swinging of the shaft 20 about axis 20a produces some movement of transverse member 49, the movement is not substantial enough to actuate valve 59, which is only actuated by rotation of the shaft 20 about longitudinal axis 20b.

To move the vehicle 12 in a forward direction, the operator swings steering control shaft 21 forwardly about axis 21a causing the transverse member 68 to move forwardly with the shaft, carrying the steering links 69 and 70 along with it. The resulting longitudinal movement of links 69 and 70 in direction 78 pivots actuating members 71 and 72 in directions 74 and 79, respectively, resulting in the drive units 26 and 28 transmitting forward rotation 75 to the two pairs of wheels. The further forward along arc 65 that the control shaft is swung, the greater the velocity of wheel rotation and the resulting forward velocity of the vehicle.

To stop the forward movement, the operator swings the control shaft rearwardly from the forward to the neutral position, at which point there is no further rotational energy delivered to the wheels. To produce a breaking effect, the steering control shaft may be swung rearwardly to the reverse position to generate reverse torque to the wheels, thereby stopping any forward momentum. If it is desired to reverse the vehicle the operator swings the control shaft rearwardly about axis 21a which causes transverse member 68 to move links 69 and 70 in direction 80 to pivot actuating members 71 and 72 rearwardly in the direction of arrows 77 and 81, respectively. This pivoting results in drive units 26 and 28 energizing the wheels to rotate in a reverse direction 76, the velocity of rearward movement depending upon the extent to which the steering control shaft 21 is swung rearwardly to the "reverse" position.

When it is desired to turn the vehicle, the operator rotates the steering control shaft 21 about longitudinal axis 21b in a clockwise direction to make a clockwise turn and in a counterclockwise direction to make a counterclockwise turn. Rotation of the steering control shaft 21 about axis 21b results in rotation of the transverse member 68. This produces rearward longitudinal movement of one steering link and forward longitudinal movement of the second steering link, resulting in one actuating member being pivoted forwardly and the other rearwardly. Consequently one drive unit rotates its wheels forwardly and the other drive unit rotates its wheels rearwardly, resulting in the vehicle turning sharply about its own center. The extent to which the steering control shaft is rotated determines the velocity at which the vehicle turns.

Consequently it will be seen that the invention provides an apparatus by which an operator can fully control the vehicle with a minimum of required movement. All required movements are limited to simple hand manipulations which are easily learned and mastered with a minimum of training and experience. The shown front loader vehicle thus is easily operated by even a novice and provides one of the most simple, effective, and efficient vehicles known to the front end loader vehicle art.

While the preferred embodiments of the present invention have been described, it should be understood that various changes, adaptations and modifications may be made therein without departing from the spirit of the invention and the scope of the appended claims.

What is claimed is:

1. A front-end loader comprising;
a body, a pair of ground engaging wheels on each side of said body, a pair of elongate arms pivotally mounted on said body at the rear thereof and projecting forwardly therefrom for vertical swinging movement relative to the body about a substantially horizontal transverse axis, a loading scoop pivotally mounted on the forward end of the arms for vertical swinging movement relative thereto about a substantially horizontal transverse axis, first hydraulic power means on said body and connected with said arms for vertically swinging said arms, second hydraulic power means on said arms and connected with said scoop for swinging said scoop about its pivotal axis, a pair of reversable hydrostatic drive units, one of which is drivingly connected with the ground engaging wheels on one side of the body and the other drive unit being drivingly connected with the ground engaging wheels on the opposite side of the body, each drive unit being operable to selectively drive the associated pair of ground engaging wheels in a forward or rearward direction, a hydraulic pump on said body and connected to a source of hydraulic fluid under pressure, a valve assembly connected in communicating relation with the pump and being connected in flow controlling relation with said first and second hydraulic power means, an elongate upright scoop control shaft pivotally mounted on said body adjacent the front end thereof and being rotatable relative to said body about the longitudinal axis of said scoop control shaft and being swingable relative to said body in a forward and rearward direction about a substantially horizontal transverse axis, an elongate upright steering control shaft pivotally mounted on said vehicle adjacent the front end thereof and being disposed in closely spaced proximal relation with said scoop control shaft to permit an operator to grip and manipulate both of said control shafts, said steering control shaft being rotatable about its longitudinal axis relative to said body and being swingable in a forward or rearward direction relative to said body about a substantially horizontal transverse axis, a first pair of elongate links each being connected at one of its ends with said scoop control shaft and each link being connected at its other end with said valve assembly, one of said links being operable in response to rotation of said scoop control shaft to operate said valve assembly and control actuation of said second hydraulic power means for swinging said scoop about its pivotal axis, said other link being operable in response to forward and rearward swinging movement of the scoop control shaft to operate said valve assembly and thereby control actuation of said first hydraulic power means for swinging said arms, a second pair of elongate links each being connected at one of its ends with said steering control shaft and each being connected at its other end with one of said reversible drive units, said second pair of links being operable to actuate the drive units to propel the vehicle forwardly when said steering control shaft is swung forwardly, being operable to actuate said drive units to propel the vehicle rearwardly when said steering control shaft is swung rearwardly, said steering control shaft when rotated about its longitudinal axis causing one of said drive units to drive forwardly and thereby permit turning of the vehicle.

2. The front-end loader vehicle as defined in claim 1 wherein said hydraulic valve assembly includes first and second valves, one of said first links being pivotally connected to the lower end of said scoop control shaft and being connected with said first valve to cause said first valve to actuate said first hydraulic power means in response to swinging of said scoop control shaft about the horizontal axis.

3. The front-end loader as defined in claim 2, and further including a transverse member attached to said scoop control shaft and extending radially outward therefrom wherein the other of said first links is pivotally mounted to said transverse member and is connected to said second valve to cause said second valve to actuate said second power means for swinging said scoop in response to rotation of said scoop control shaft about the longitudinal axis of said shaft.

4. The front-end loader vehicle as defined in claim 1 and including a control box having a pair of parallel slots therein, said scoop control shaft being located within said control box and extending out of the control box through one of said slots, and said steering control shaft extending out of said control box through the remaining said slot, the limits of swinging movement of said shafts being defined by the slot, said control box further including means movably connecting said scoop control shaft to said control box.

* * * * *